US012679453B2

(12) United States Patent
Liu

(10) Patent No.: US 12,679,453 B2
(45) Date of Patent: Jul. 14, 2026

(54) STEERING APPARATUS CONTROL APPARATUS, STEERING APPARATUS CONTROL METHOD, AND STEERING SYSTEM

(71) Applicant: HITACHI ASTEMO, LTD.,
Hitachinaka (JP)

(72) Inventor: Huajun Liu, Hitachinaka (JP)

(73) Assignee: HITACHI ASTEMO, LTD.,
Hitachinaka (JP)

( * ) Notice: Subject to any disclaimer, the term of this patent is extended or adjusted under 35 U.S.C. 154(b) by 197 days.

(21) Appl. No.: 18/685,780

(22) PCT Filed: Jul. 8, 2022

(86) PCT No.: PCT/JP2022/027144
§ 371 (c)(1),
(2) Date: Aug. 8, 2024

(87) PCT Pub. No.: WO2023/037750
PCT Pub. Date: Mar. 16, 2023

(65) Prior Publication Data
US 2025/0333101 A1 Oct. 30, 2025

(30) Foreign Application Priority Data
Sep. 13, 2021 (JP) ................................. 2021-148389

(51) Int. Cl.
B62D 6/00 (2006.01)
B62D 5/04 (2006.01)
(52) U.S. Cl.
CPC ........... B62D 6/003 (2013.01); B62D 5/0457 (2013.01); B60W 2520/14 (2013.01); B62D 6/001 (2013.01)

(58) Field of Classification Search
CPC ....... B60W 2520/14; B62D 5/001–006; B62D 5/0457; B62D 6/001; B62D 6/003;
(Continued)

(56) References Cited

U.S. PATENT DOCUMENTS

| 6,226,579 B1 | 5/2001 | Hackl et al. |
| 7,997,373 B2 * | 8/2011 | Yasui ..................... B62D 6/003 |
| | | 701/41 |
| 2005/0080532 A1 | 4/2005 | Kato et al. |

FOREIGN PATENT DOCUMENTS

| JP | H-10-315997 A | 12/1998 |
| JP | 2002-046638 A | 2/2002 |
(Continued)

OTHER PUBLICATIONS

Hara, JP 2006-347286, machine translation. (Year: 2006).*
(Continued)

*Primary Examiner* — Mark L. Greene
(74) *Attorney, Agent, or Firm* — FOLEY & LARDNER LLP

(57) ABSTRACT

A steering apparatus control apparatus, a steering apparatus control method, and a steering system according to the present invention are applied to a vehicle including a steering apparatus configured to be able to control a steering angle of road wheels independently of an operation quantity of a steering operation input member, compare a target yaw rate based on a physical quantity about a running state of the vehicle and the operation quantity of the steering operation input member with an actual yaw rate based on the physical quantity about the running state of the vehicle, and control a steering actuator in a direction in which a yaw rate of the vehicle is cancelled out such that the actual yaw rate approximates the target yaw rate. In this way, vehicle behavior that agrees with driver intention can be realized.

5 Claims, 4 Drawing Sheets

(58) Field of Classification Search
CPC .... G05D 1/0061; G05D 1/0088; G05D 1/021;
G05D 1/0214; G05D 1/0221; G05D
1/0223
See application file for complete search history.

(56) References Cited

FOREIGN PATENT DOCUMENTS

| | | | | |
|---|---|---|---|---|
| JP | 2005-112285 | A | | 4/2005 |
| JP | 2006347286 | A | * | 12/2006 |
| JP | 2009154619 | A | * | 7/2009 |
| JP | 2010-137745 | A | | 6/2010 |

OTHER PUBLICATIONS

Tsukasaki, JP 2009-154619, machine translation. (Year: 2009).*
International Preliminary Report on Patentability dated Mar. 28,
2024 issued in International Application No. PCT/JP2022/027144,
with English translation, 10 pages.
International Search Report dated Sep. 27, 2022 issued in International Application. No. PCT/JP2022/027144, with English translation, 5 pages.

* cited by examiner

STEERING APPARATUS CONTROL APPARATUS, STEERING APPARATUS CONTROL METHOD, AND STEERING SYSTEM

TECHNICAL FIELD

The present invention relates to a steering apparatus control apparatus, to a steering apparatus control method, and to a steering system.

BACKGROUND ART

Patent Document 1 discloses a vehicle steering control apparatus that estimates the difference between the braking force applied to the right and left road wheels, calculates a braking force difference control quantity based on the braking force difference in the direction in which the yaw moment generated by the braking force difference is canceled out, and controls the output angle (the turning quantity) by adding the braking force difference control quantity when the yaw moment generated by the braking force difference is generated.

REFERENCE DOCUMENT LIST

Patent Document

Patent Document 1: JP 2005-112285 A

SUMMARY OF THE INVENTION

Problem to be Solved by the Invention

For example, while a vehicle is running on a μ-split road of which the friction coefficient differs between the right road wheels and the left road wheels of the vehicle, if the driver operates a braking apparatus and applies braking force, the vehicle may swerve toward the side having the higher friction coefficient because of the difference between the right braking force and the left braking force.

Because such swerving of a vehicle is a behavior that does not agree with the intention of the driver of the vehicle, operation stability deteriorates, and the driver may have a sense of discomfort.

The present invention has been made in view of actual circumstances, and it is an object of the present invention to provide a steering apparatus control apparatus, a steering apparatus control method, and a steering system that can realize vehicle behavior that agrees with driver intention.

Means for Solving the Problem

In one aspect of the present invention, a target yaw rate based on a physical quantity about a running state of a vehicle and an operation quantity of a steering operation input member is compared with an actual yaw rate based on the physical quantity about the running state of the vehicle, and a steering actuator is controlled in a direction in which a yaw rate of the vehicle is cancelled out such that the actual yaw rate approximates the target yaw rate.

Effects of the Invention

The present invention can realize vehicle behavior that agrees with driver intention.

MODE FOR CARRYING OUT THE INVENTION

Hereinafter, examples of a steering apparatus control apparatus, a steering apparatus control method, and a steering system according to the present invention will be described with reference to the drawings.

Figure 1:
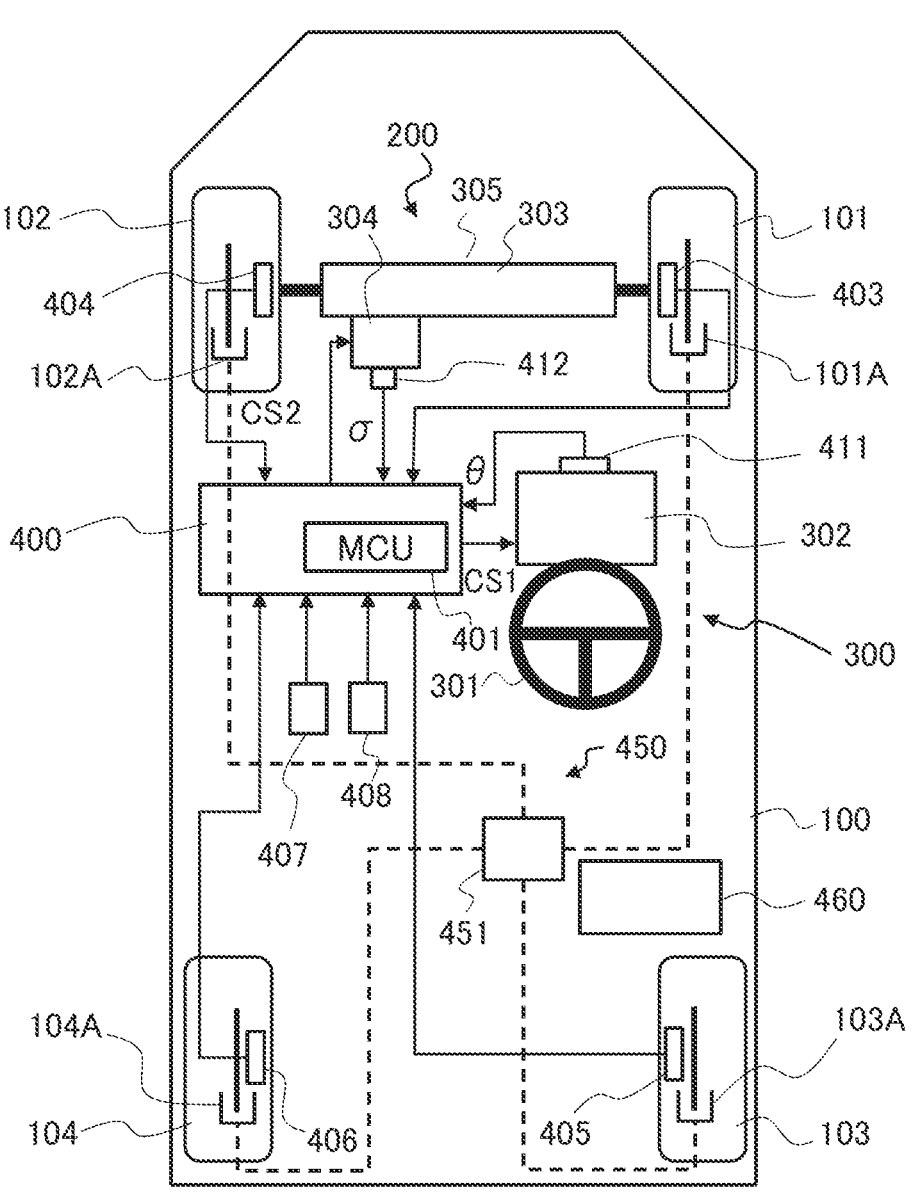
FIG. 1 is a configuration diagram illustrating a mode of a steering system of a vehicle.

FIG. 1 is a configuration diagram illustrating a mode of a steering system 200 mounted in a vehicle 100.

Vehicle 100 is a four-wheel vehicle having four road wheels 101 to 104.

Steering system 200 includes a steering apparatus 300 and a control apparatus 400 for controlling actuators of steering apparatus 300.

Steering apparatus 300 includes a steering wheel 301, which is a steering operation input member operated by a driver, a reaction force actuator 302, which applies reaction force torque to steering wheel 301, and a steering device 305, which can change a steering angle σ (in other words, the tire angle) of front road wheels 101 and 102, which are the steered road wheels of the vehicle 100.

Steering device 305 includes a steering actuator 304, which adds steering torque (in other words, steering force) to front road wheels 101 and 102 via a steering member 303.

In steering apparatus 300, for example, electric motors are used as reaction force actuator 302 and steering actuator 304.

In steering apparatus 300, steering wheel 301 is mechanically separate from front road wheels 101 and 102, which are the steered road wheels, that is, from steering device 305.

That is, steering apparatus 300 is a steer-by-wire steering apparatus in which the steering angle of front road wheels 101 and 102 can be controlled independently of the operation angle (in other words, the operation quantity) of steering wheel 301.

Control apparatus 400 is an electronic control apparatus including a micro controller unit (MCU) 401.

If steering actuator 304 is an electric motor, control apparatus 400 may include not only MCU 401 but also a pre-driver, an inverter, etc., for controlling the current supplied to the electric motor.

Alternatively, the steering system 200 may be configured to include a drive circuit including a pre-driver, an inverter, etc., separately from control apparatus 400.

MCU 401 may be referred to as a microcomputer, a processor, a processing device, an arithmetic device, or the like.

MCU 401 of control apparatus 400 acquires information about the state of vehicle 100 and information about the state of steering apparatus 300.

Based on the acquired state information, MCU 401 calculates a control signal CS1 for reaction force actuator 302 and a control signal CS2 for steering actuator 304, and outputs calculated control signals CS1 and CS2 to reaction force actuator 302 and steering actuator 304, respectively. In this way, MCU 401 controls the reaction force torque applied to steering wheel 301 and the steering torque (that is, steering angle σ of front road wheels 101 and 102).

Vehicle 100 includes, as sensors for detecting the running state of vehicle 100, road wheel speed sensors 403 to 406 for detecting the road wheel speed of each of road wheels 101 to 104, a yaw rate sensor 407 for detecting a yaw rate γ of vehicle 100, and an acceleration sensor 408 for detecting the longitudinal acceleration and the lateral acceleration of vehicle 100.

In addition, steering apparatus 300 includes, as sensors for detecting the operation state of steering apparatus 300, an operation angle sensor 411 for detecting an operation angle θ of steering wheel 301 and a steering angle sensor 412 for detecting steering angle σ of front road wheels 101 and 102.

If steering device 305 changes steering angle σ of front road wheels 101 and 102 by using a rack-and-pinion mechanism, steering angle sensor 412 can detect the rotation angle of the pinion shaft as a physical quantity equivalent to steering angle σ.

Operation angle sensor 411 detects the neutral position of steering wheel 301 as 0 degrees.

For example, operation angle sensor 411 detects operation angle θ as a positive angle when steering wheel 301 is operated from the neutral position to the left, and detects operation angle θ as a negative angle when steering wheel 301 is operated from the neutral position to the right.

Similarly, steering angle sensor 412 detects the neutral position of front road wheels 101 and 102 as 0 degrees.

For example, steering angle sensor 412 detects steering angle σ as a positive angle when front road wheels 101 and 102 are steered from the neutral position to the left, and detects steering angle σ as a negative angle when front road wheels 101 and 102 are steered from the neutral position to the right.

The neutral position of front road wheels 101 and 102 is the position corresponding to when front wheels 101 and 102 are steered neither to the right nor the left. When front road wheels 101 and 102 are at the neutral position, vehicle 100 runs straight.

The neutral position of steering wheel 301 is the position corresponding to when steering wheel 301 is operated neither to the right nor the left. When steering wheel 301 is at its neutral position, front road wheels 101 and 102 are maintained at their neutral position.

For example, yaw rate sensor 407 detects the change rate as a positive value when the yaw in the left direction is generated, and detects the change rate as a negative value when the yaw in the right direction is generated.

In addition, vehicle 100 includes a braking apparatus 450 for applying braking force to each of road wheels 101 to 104.

For example, braking apparatus 450 is a hydraulic braking apparatus, which includes a liquid pressure generation device 451 including a master cylinder, etc., and includes wheel cylinders 101A to 104A attached to road wheels 101 to 104, respectively.

With this braking apparatus 450, when the driver presses the brake pedal (not illustrated), liquid pressure generation device 451 sends brake fluid to wheel cylinders 101A to 104A.

Wheel cylinders 101A to 104A displace their respective brake shoes (not illustrated) based on the brake fluid pressure, so as to apply braking force to each of road wheels 101 to 104.

Although a hydraulic braking apparatus is used as braking apparatus 450 in this example, a different kind of braking apparatus may alternatively be used.

MCU 401 acquires, for example, information about operation angle θ of steering wheel 301, and calculates a target steering angle σtg of front road wheels 101 and 102 based on the acquired information.

For example, MCU 401 calculates target steering angle σtg by multiplying a detected value of operation angle θ by a steering gear ratio.

In addition, MCU 401 calculates control signal CS2 such that an actual steering angle σ detected by steering angle sensor 412 approximates target steering angle σtg, and outputs calculated control signal CS2 to steering actuator 304.

That is, MCU 401 constitutes a control unit, which outputs control signal CS2 to steering actuator 304 based on a physical quantity about operation angle θ of steering wheel 301.

In addition, to reduce yaw-direction vehicle behavior that does not agree with driver intention, MCU 401 has a function of correcting steering angle σ of front road wheels 101 and 102 from steering angle σ matching operation angle θ of steering wheel 301.

That is, when the yaw-direction behavior of vehicle 100 agrees with driver intention, MCU 401 sets steering angle σ matching operation angle θ of steering wheel 301.

In contrast, when the yaw-direction behavior of vehicle 100 deviates from driver intention, MCU 401 corrects steering angle σ from steering angle σ matching operation angle θ of steering wheel 301, so as to reduce this behavior.

First Example

Hereinafter, steering angle control (which will also be referred to as vehicle behavior control) for reducing yaw-direction vehicle behavior that does not agree with driver intention will be described in detail.

The first example assumes that the vehicle behavior control is performed when braking is performed on a μ-split road surface.

In vehicle behavior control, MCU 401 calculates a target yaw rate γtg, which is a yaw rate γ agreeing with driver intention, based on physical quantities about the running state of vehicle 100 and operation angle θ of steering wheel 301.

In addition, MCU 401 acquires information about an actual yaw rate γa, which is actually generated in vehicle 100, based on the physical quantities about the running state of vehicle 100.

Next, MCU 401 compares target yaw rate γtg with actual yaw rate γa. If there is a difference between target yaw rate γtg and actual yaw rate γa, that is, if the yaw-direction behavior of vehicle 100 differs from driver intention, MCU 401 controls steering actuator 304 in a direction in which yaw rate γ of vehicle 100 is cancelled out such that actual yaw rate γa approximates target yaw rate γtg.

For example, there is a case in which vehicle 100 is running straight on a μ-split road, and the driver operates braking apparatus 450. In this case, if there is a difference between the right braking force and the left braking force, vehicle 100 swerves toward the side having the higher friction coefficient, and a difference is caused between target yaw rate γtg and actual yaw rate γa.

In this case, by correcting steering angle σ in a direction in which the difference between target yaw rate γtg and actual yaw rate γa is reduced, MCU 401 prevents vehicle 100 from swerving due to the difference between the right braking force and the left braking force contrary to driver intention.

Thus, even when the driver operates braking apparatus 450 while vehicle 100 is running on a μ-split road, it is possible to realize vehicle behavior (yaw behavior) agreeing with driver intention, in other words, vehicle behavior matching operation angle θ of steering wheel 301, and to prevent deterioration in operation stability.

Figure 2:
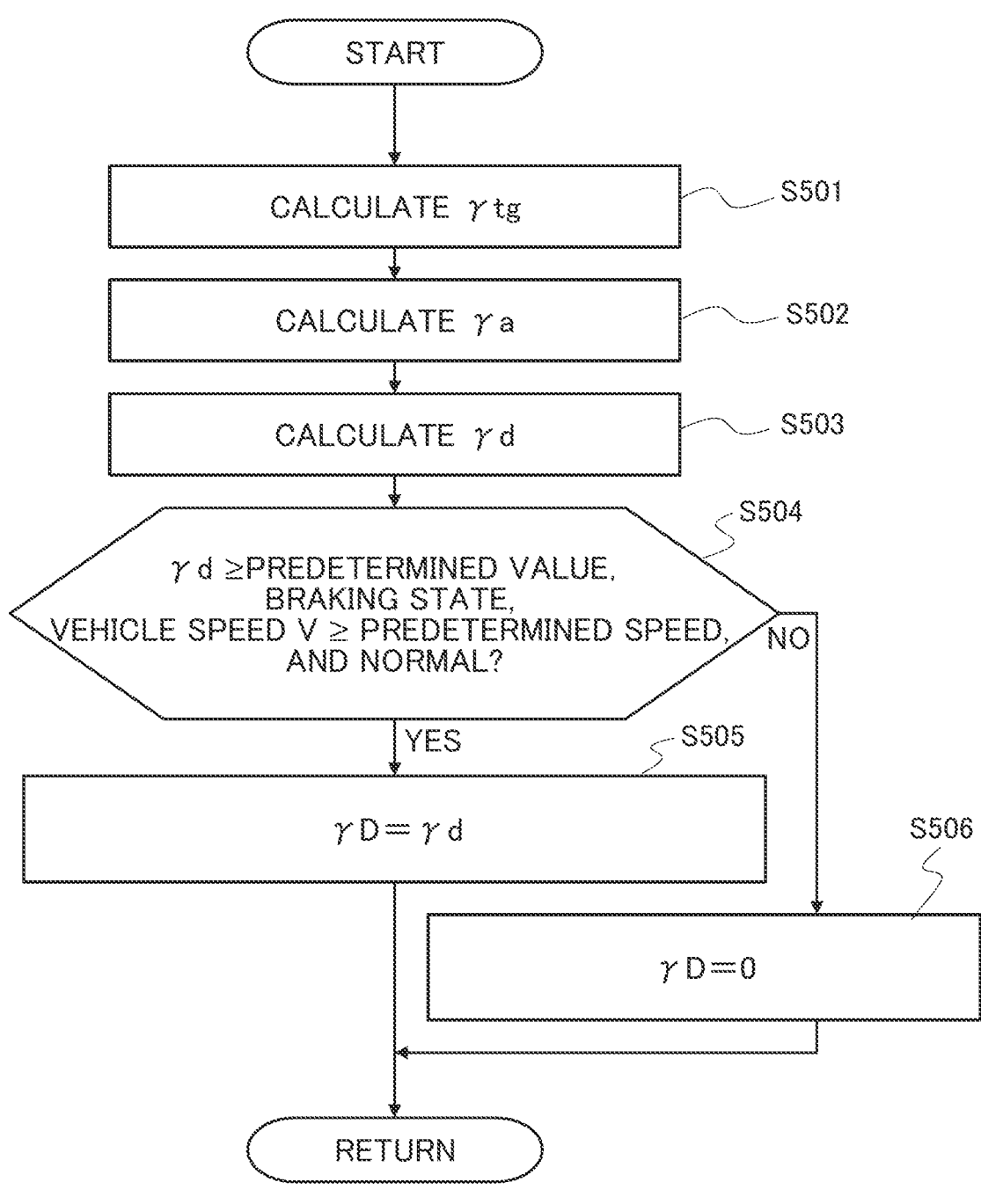
FIG. 2 is a flowchart illustrating a yaw rate difference calculation process.
Figure 3:
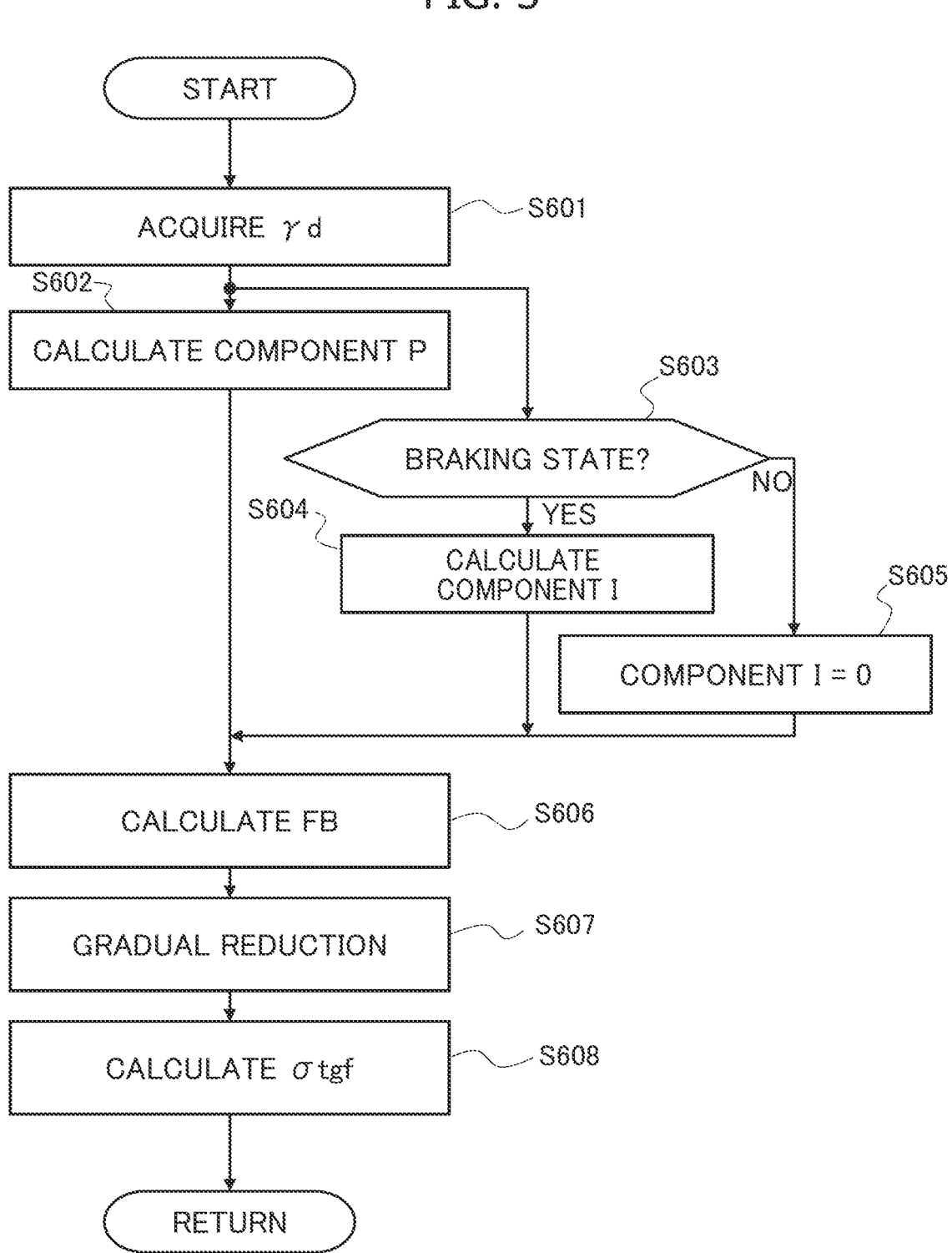
FIG. 3 is a flowchart illustrating a target steering angle calculation process.

FIGS. 2 and 3 are flowcharts, each of which illustrates a steering control process that MCU 401 performs to realize vehicle behavior agreeing with driver intention.

The flowchart in FIG. 2 illustrates a mode of a process for acquiring a yaw rate difference γd, which is the difference between target yaw rate γtg and actual yaw rate γa.

In step S501, MCU 401 acquires a physical quantity about target yaw rate γtg, which is yaw rate γ agreeing with driver intention, based on information about operation angle θ of steering wheel 301 and the physical quantities about the running state of vehicle 100.

By adopting various known techniques, MCU 401 can calculate target yaw rate γtg, which is yaw rate γ agreeing with driver intention.

For example, MCU 401 calculates target yaw rate γtg in accordance with Equation 1 based on information about target steering angle σ calculated from operation angle θ of steering wheel 301 (target steering angle σ=steering gear ratio×operation angle θ) and based on information about vehicle speed V of vehicle 100 calculated from the output signals of road wheel speed sensors 403 to 406.

$$\gamma tg = \frac{1}{1 + A \cdot V^2}\left(\frac{V}{l} \cdot \sigma\right) * \frac{1}{(\tau_s + 1)} \qquad \text{[Equation 1]}$$

In Equation 1, "A" represents a stability factor, "l" (lower case letter L) represents the wheelbase, and τs represents the control response time constant of the target yaw rate.

Next, in step S502, MCU 401 acquires a physical quantity about actual yaw rate γa, based on the physical quantities about the running state of vehicle 100.

MCU 401 can acquire the physical quantity about actual yaw rate γa, based on a signal output from yaw rate sensor 407.

MCU 401 can calculate the physical quantity about actual yaw rate γa from a physical quantity about the lateral acceleration (centripetal acceleration) detected by acceleration sensor 408 and a physical quantity about vehicle speed V.

Next, in step S503, MCU 401 compares target yaw rate γtg with actual yaw rate γa, and acquires information about yaw rate difference γd (yaw rate difference γd=actual yaw rate γa−target yaw rate γtg).

Next, in step S504, MCU 401 determines whether intervention conditions for the vehicle behavior control in which steering actuator 304 is controlled in a direction in which yaw rate γ of vehicle 100 is cancelled out are established.

If MCU 401 determines that the intervention conditions are established, the process proceeds to step S505. Otherwise, the process proceeds to step S506.

If all the following first to fourth conditions are established, MCU 401 determines that the intervention conditions for the vehicle behavior control are established, and the process proceeds to step S505. If at least one of the four conditions is not established, MCU 401 determines that the intervention conditions for the vehicle behavior control are not established, and the process proceeds to step S506.

First condition: yaw rate difference γd≥predetermined value (predetermined value>0)
Second condition: braking state
Third condition: vehicle speed V≥predetermined speed (predetermined speed>0)
Fourth condition: steering apparatus is normal The first condition is that yaw rate difference γd is equal to or greater than a predetermined value. Specifically, the first condition is that the absolute value of actual yaw rate γa is greater than the absolute value of target yaw rate γtg and that the difference therebetween is equal to or greater than a predetermined value.

The second condition is that braking apparatus 450 is generating braking force.

The third condition is that the vehicle speed of vehicle 100 is equal to or greater than a predetermined speed, which is, for example, approximately between 2 km/h and 10 km/h, at which vehicle 100 is coming to a stop. In other words, the predetermined speed is the speed at which vehicle 100 runs immediately before vehicle 100 comes to a stop.

If steering device 305 is in an abnormal state, MCU 401 determines that the fourth condition is not established. For example, if MCU 401 acquires abnormality information indicating an abnormality in yaw rate signal via an in-vehicle network, MCU 401 determines that the fourth condition is not established.

Among the above four conditions, the first and second conditions are for determining whether the difference between the right braking force and the left braking force is caused by braking on a μ-split road surface and whether vehicle 100 is consequently swerving.

In other words, MCU 401 uses the first condition to determine whether there is a great difference between target yaw rate γtg and actual yaw rate γa, and uses the second condition to determine whether the first condition is established by the difference between the right braking force and the left braking force.

If the difference between target yaw rate γtg and actual yaw rate γa is reduced to fall within a predetermined range, MCU 401 determines that the intervention conditions (specifically, the first condition) are not established, and sets steering angle σ to a target value calculated from operation angle θ of steering wheel 301, as will be described in detail below.

If the braking by braking apparatus 450 ends, MCU 401 determines that the intervention conditions (specifically, the second condition) are not established, and sets steering angle σ to the target value calculated from operation angle θ of steering wheel 301, as will be described in detail below.

Thus, after the yaw that does not agree with driver intention is reduced to fall within a predetermined range, steering angle σ matching operation angle θ of steering wheel 301 is restored, and a sense of discomfort of the driver is reduced.

The third condition is to determine whether vehicle 100 is running at vehicle speed V that needs the intervention control by MCU 401.

That is, the vehicle speed range less than a predetermined speed (less than a predetermined value) indicated by the third condition is the vehicle speed range in which the driver can appropriately perform a swerve prevention steering operation even when vehicle 100 swerves due to the difference between the right braking force and the left braking force.

Thus, when vehicle speed V is less than a predetermined speed, MCU 401 determines that the intervention conditions are not established, and stops outputting the control signal for approximating actual yaw rate γa to target yaw rate γtg to steering actuator 304.

In other words, when vehicle 100 is stopping, MCU 401 stops the vehicle behavior control, and sets steering angle σ to the target value calculated from operation angle θ of steering wheel 301.

When vehicle 100 restarts after coming to a stop, if steering angle σ does not agree with operation angle θ of steering wheel 301, operation stability is deteriorated, and the driver has a sense of discomfort.

In contrast, in the present example, when vehicle 100 is stopping, MCU 401 sets steering angle σ matching operation angle θ of steering wheel 301. Therefore, it is possible to prevent deterioration in operation stability when vehicle 100 restarts, and to prevent the driver from having a sense of discomfort.

In addition, the fourth condition is to determine whether MCU 401 can normally perform the intervention control.

If an abnormality occurs in steering device 305, MCU 401 determines that the intervention conditions are not established, and stops outputting the control signal for approximating actual yaw rate γa to target yaw rate γtg to steering actuator 304.

By using the fourth condition as one of the intervention control execution conditions, MCU 401 can prevent performing the intervention control with abnormal steering device 305 and can consequently prevent performing unexpected steering control.

If MCU 401 determines that the intervention conditions are established and the process proceeds to step S505, MCU 401 sets yaw rate difference γd calculated in step S503 as yaw rate difference γD used in the vehicle behavior control (yaw rate difference γD=yaw rate difference γd).

In this case, as will be described in detail below, MCU 401 performs the vehicle behavior control of outputting the control signal in the direction in which yaw rate γ of vehicle 100 is cancelled out to steering actuator 304 such that actual yaw rate γa approximates target yaw rate γtg.

In other words, MCU 401 performs the vehicle behavior control of correcting steering angle σ in the direction opposite to the yaw direction of vehicle 100 such that yaw rate difference γD approximates 0.

By performing this vehicle behavior control, MCU 401 can prevent vehicle 100 from swerving contrary to driver intention, even when a difference is caused between the right braking force and the left braking force by braking on a μ-split road surface.

In contrast, if MCU 401 determines that the intervention conditions are not established and the process proceeds to step S506, MCU 401 sets yaw rate difference γD used in the vehicle behavior control to 0. That is, by assuming that actual yaw rate γa matches target yaw rate γtg in the control, MCU 401 stops the intervention for the vehicle behavior control (in other words, MCU 401 cancels the vehicle behavior control).

In this case, as will be described in detail below, by performing the normal control in which steering angle σ matching operation angle θ of steering wheel 301 is set, MCU 401 sets steering angle σ matching operation angle θ of steering wheel 301, thereby preventing the driver from having a sense of discomfort.

As described above, the braking state indicated by the second condition in step S504 is a state in which braking apparatus 450 generates braking force.

MCU 401 can determine whether the second condition is established based on information about the longitudinal acceleration detected by acceleration sensor 408.

Specifically, MCU 401 can determine that the second condition is established, that is, vehicle 100 is in a braking state, when acceleration sensor 408 detects a negative acceleration (in other words, deceleration), which is the acceleration in the direction opposite the running direction of vehicle 100, and when the absolute value of the negative acceleration represents a predetermined acceleration or more.

In other words, assuming that the acceleration is represented by a positive or negative value, MCU 401 can determine that vehicle 100 is in a braking state if the actual acceleration is less than a predetermined negative acceleration, and can determine that vehicle 100 is not in a braking state if the actual acceleration is equal to or greater than the predetermined negative acceleration.

In this case, when the actual acceleration is equal to or greater than the predetermined negative acceleration, MCU 401 determines that the intervention conditions are not established, and stops outputting the control signal for approximating actual yaw rate γa to target yaw rate γtg to steering actuator 304.

MCU 401 may acquire an on-off signal of a brake switch, which is switched on when braking apparatus 450 of vehicle 100 is in an operation state and is switched off when braking apparatus 450 of vehicle 100 is in a non-operation state. In this case, when the brake switch is on, MCU 401 can determine that the second condition is established, that is, vehicle 100 is in a braking state.

Alternatively, MCU 401 may acquire a physical quantity about the braking force, such as the brake fluid pressure of braking apparatus 450. In this case, when the brake fluid pressure is equal to or greater than a predetermined value, MCU 401 can determine that the second condition is established, that is, vehicle 100 is in a braking state.

The flowchart in FIG. 3 illustrates a mode of the vehicle behavior control, which is control of steering actuator 304 based on yaw rate difference γD.

In the vehicle behavior control illustrated by the flowchart in FIG. 3, MCU 401 calculates a feedback operation quantity FB for correcting target steering angle σtg matching operation angle θ of steering wheel 301 based on yaw rate difference γD.

Feedback operation quantity FB includes a proportional component P (in other words, a proportional operation quantity) calculated by a proportional operation and an integral component I (in other words, an integral operation quantity) calculated by an integral operation.

MCU 401 corrects target steering angle σtg matching operation angle θ of steering wheel 301 with feedback operation quantity FB, sets a result obtained by the correction as a final target steering angle σtgf, and controls steering actuator 304 such that actual steering angle σ approximates target steering angle σtgf.

That is, through the correction control of target steering angle σtg based on yaw rate difference γD, MCU 401 controls steering actuator 304 in the direction in which yaw rate γ of vehicle 100 is cancelled out such that actual yaw rate γa approximates target yaw rate γtg (in other words, such that yaw rate difference γD approximates 0).

Hereinafter, each step illustrated in the flowchart illustrated in FIG. 3 will be described in detail.

In step S601, MCU 401 acquires yaw rate difference γD calculated in accordance with the process illustrated in the flowchart in FIG. 2.

Next, in step S602, MCU 401 calculates proportional component P based on a proportional operation that changes the operation quantity of steering angle σ in proportion to the magnitude of yaw rate difference γD.

MCU 401 also calculates integral component I in steps S603 to S605 while calculating proportional component P in step S602.

In step S603, MCU 401 determines whether vehicle 100 is in a braking state from a detected value of the longitudinal acceleration, an on-off signal of the brake switch, a signal of the brake fluid pressure, etc.

If MCU 401 determines that vehicle 100 is in a braking state, the process proceeds to step S604.

In step S604, MCU 401 calculates integral component I based on an integral operation in which the speed of change in operation quantity of steering angle σ is proportionated to yaw rate difference γD.

If MCU 401 determines that vehicle 100 is not in a braking state, the process proceeds to step S605, and MCU 401 sets integral component I to 0.

For example, when the braking on a μ-split road surface ends, the yaw moment generated in vehicle 100 by the braking is set to 0. Thus, when the braking ends, MCU 401 sets integral component I to 0, and stops the integral operation.

In step S606, MCU 401 calculates feedback operation quantity FB by adding up proportional component P and integral component I.

Next, in step S607, MCU 401 gradually reduces feedback operation quantity FB as vehicle speed V drops.

For example, MCU 401 reduces a coefficient K for gradually reducing feedback operation quantity FB from 100% as vehicle speed V drops from a predetermined speed such that coefficient K reaches 0% when vehicle speed V reaches 0 km/h.

MCU 401 sets a result obtained by multiplying feedback operation quantity FB calculated in step S606 by coefficient K as gradually-reduced feedback operation quantity FBd.

Next, in step S608, MCU 401 adds feedback operation quantity FBb to target steering angle σtg matching operation angle θ of steering wheel 301, to calculate final target steering angle σtgf.

MCU 401 adjusts the control signal that is output to steering actuator 304 such that actual steering angle σ detected by steering angle sensor 412 approximates target steering angle σtgf.

By performing the above vehicle behavior control, which is control of steering angle σ based on yaw rate difference γD, for example, MCU 401 can prevent vehicle 100 from swerving contrary to driver intention due to the difference between the right braking force and the left braking force on a μ-split road surface, and can realize vehicle behavior agreeing with driver intention.

In addition, when vehicle 100 stops after the intervention for the vehicle behavior control, MCU 401 can set steering angle σ matching operation angle θ of steering wheel 301. Therefore, it is possible to prevent deterioration in operation stability when vehicle 100 restarts, and to prevent the driver from having a sense of discomfort.

When vehicle 100 is stopping, MCU 401 may reduce the speed of driving of steering actuator 304 (in other words, the steering speed of front road wheels 101 and 102) for restoring steering angle σ matching operation angle θ of steering wheel 301, compared with the speed of driving of steering actuator 304 when the vehicle 100 is running.

Because the vehicle noise caused when vehicle 100 is stopping is less than that caused when vehicle 100 is in a running state (in other words, when vehicle 100 is running), the operating noise of steering actuator 304 is transmitted to the driver more easily. As a result, the operation sound of the steering actuator 304 caused when steering angle σ matching operation angle θ of steering wheel 301 is restored may give a sense of discomfort to the driver.

Thus, when vehicle 100 is stopping, by reducing the speed of driving of steering actuator 304 for restoring steering angle σ matching operation angle θ of steering wheel 301 compared with the speed of driving of steering actuator 304 in a running state, MCU 401 reduces the operating sound of steering actuator 304, to prevent the operating sound of steering actuator 304 from being transmitted to the driver.

In other words, when vehicle 100 is in a running state, MCU 401 increases the speed of driving of steering actuator 304 for restoring steering angle σ matching operation angle θ of steering wheel 301 compared with the speed of driving of steering actuator 304 when vehicle 100 is stopping.

In this way, when vehicle 100 is in a running state, when the yaw behavior generated by braking is reduced to fall within a predetermined range, and when MCU 401 ends the vehicle behavior control, MCU 401 can promptly restore steering angle σ matching operation angle θ of steering wheel 301, and can ensure the steering operability of the driver.

For example, MCU 401 may be configured to control steering actuator 304 based on target steering angle σtgf obtained by processing target steering angle σtgf with a first-order lag element. In this case, by changing the time constant of the first-order lag element, MCU 401 can vary the driving speed.

By changing the gain in the process of calculating the control signal that is output to steering actuator 304 based on the difference between target steering angle σtgf and actual steering angle σ, MCU 401 can vary the driving speed.

MCU 401 may vary the driving speed for driving steering actuator 304 in the direction in which yaw rate γ of vehicle 100 is cancelled out, based on the deceleration due to braking.

When the deceleration due to braking is great, the yaw moment of vehicle 100 sharply increases. Thus, if the response of steering angle σ is delayed, swerving of vehicle 100 may not be reduced sufficiently.

Thus, MCU 401 increases the speed of driving of steering actuator 304 in the direction in which yaw rate γ of vehicle 100 is cancelled out as the deceleration due to braking increases.

In this way, even when sudden braking is performed, swerving of vehicle 100 contrary to driver intention can be prevented.

MCU 401 can determine the magnitude of the deceleration from the longitudinal acceleration detected by acceleration sensor 408 or the brake fluid pressure (in other words, a braking operation quantity).

That is, if the longitudinal acceleration detected by acceleration sensor 408 is negative acceleration and if the absolute value of the acceleration is greater, MCU 401 can determine that the deceleration is greater.

In addition, MCU 401 can determine that the deceleration is greater if the brake fluid pressure is higher.

Second Example

The above first example assumes that the control is performed when braking is performed on a μ-split road surface. However, when a driving apparatus 460 of vehicle 100 generates driving force, for example, when vehicle 100 starts and accelerates, vehicle 100 may swerve due to the difference between the right driving force and the left driving force.

Thus, when driving apparatus 460 of vehicle 100 generates driving force, MCU 401 can perform vehicle behavior control.

Driving apparatus 460 is an internal-combustion engine, an electric motor, or the like.

Hereinafter, the vehicle behavior control performed when driving force is generated (in other words, when vehicle 100 starts and accelerates) will be described as a second example.

Figure 4:
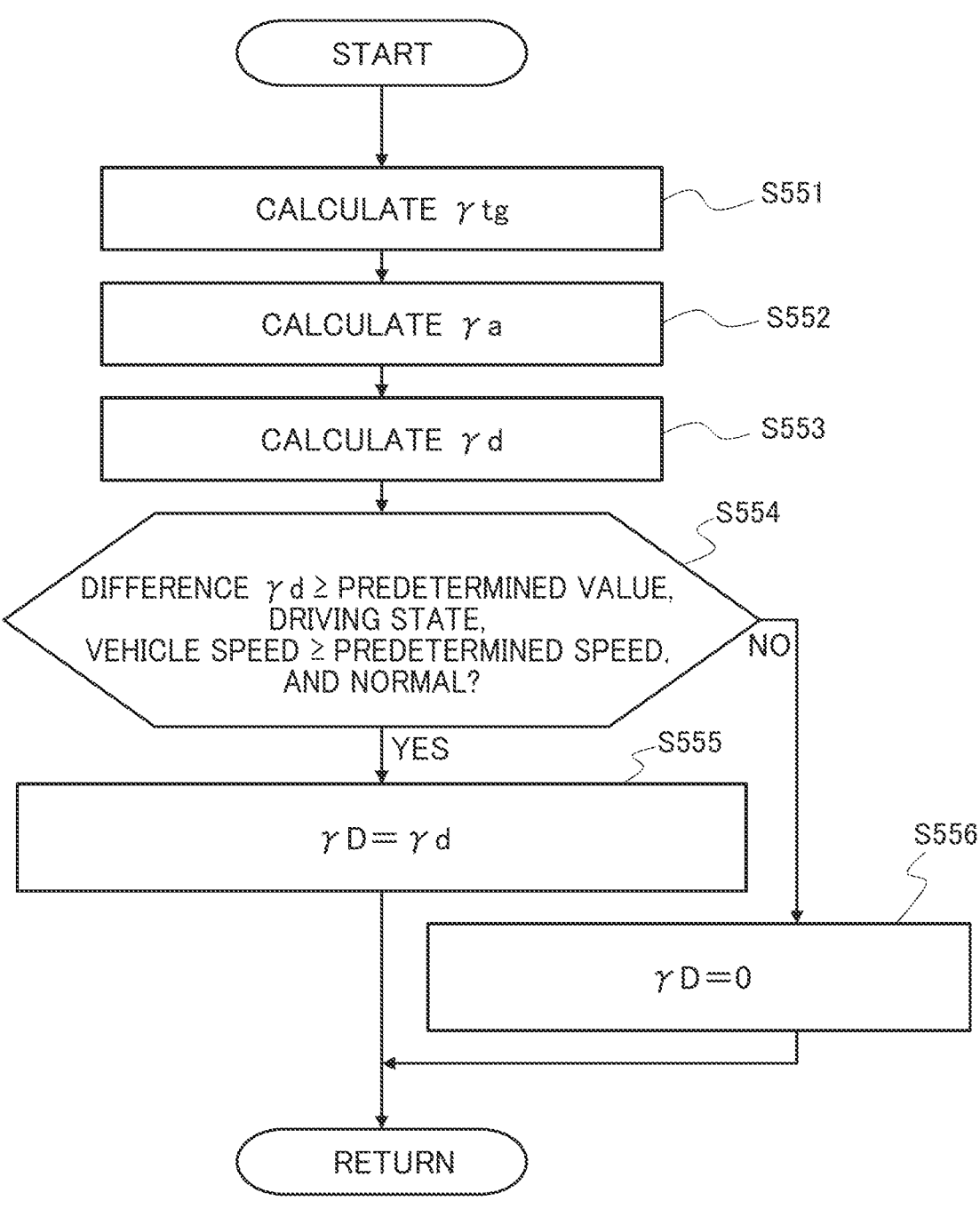
FIG. 4 is a flowchart illustrating a yaw rate difference calculation process.

FIG. 4 is a flowchart illustrating a mode of a process for acquiring yaw rate difference γd according to the second example.

The flowchart in FIG. 4 differs from the flowchart in FIG. 2 only in the intervention condition determination process in step S554. Steps S551 to S553, S555, and S556 are the same as steps S501 to S503, S505, and S506 in the flowchart in FIG. 2.

MCU 401 performs the process for setting target steering angle σtgf based on yaw rate difference γD, which is calculated in accordance with the flowchart in FIG. 4, in accordance with the process illustrated in the above-described flowchart in FIG. 3.

Thus, hereinafter, only the intervention condition determination process in step S554 will be described in detail.

In step S554, MCU 401 determines whether all the following first to fourth conditions are established.

First condition: yaw rate difference γd≥predetermined value

Second condition: driving force generation state

Third condition: vehicle speed V≥predetermined speed

Fourth condition: steering apparatus is normal

Only the second condition differs between the four conditions in step S554 and the four conditions in step S504 in the flowchart in FIG. 2.

That is, while the first example assumes that the vehicle behavior control is performed when braking is performed on a μ-split road surface, the second example assumes that the vehicle behavior control is performed when vehicle 100 starts and accelerates on a μ-split road surface. In other words, when vehicle 100 starts and accelerates, MCU 401 performs the vehicle behavior control in order to prevent vehicle 100 from swerving due to the difference between the right driving force and the left driving force.

MCU 401 can detect the driving force generation state of the second condition if the longitudinal acceleration of vehicle 100 is equal to or greater than a predetermined value (predetermined value>0).

Alternatively, MCU 401 may detect the driving force generation state of the second condition if the pressing quantity or speed of the accelerator pedal operated by the driver is equal to or greater than a predetermined value.

Still alternatively, MCU 401 may detect the driving force generation state of the second condition if the load of driving apparatus 460 is equal to or greater than a predetermined value.

When vehicle 100 accelerates on a μ-split road surface, vehicle 100 may swerve toward the side having the lower driving force due to the difference between the right driving force and the left driving force.

In this case, according to the second example, if the intervention conditions are established, MCU 401 performs the vehicle behavior control and controls steering actuator

304 in the direction in which the yaw rate of vehicle 100 is cancelled out such that actual yaw rate γa approximates target yaw rate γtg.

In this way, when vehicle 100 accelerates on a μ-split road surface, it is possible to prevent vehicle 100 from swerving contrary to driver intention, and to improve operation stability on the μ-split road surface.

MCU 401 can perform the vehicle behavior control either when vehicle 100 is in a braking state or in a driving force generation state on a μ-split road surface.

The individual technical concepts described in the above-described examples can be appropriately combined and used, as long as there is no conflict.

In addition, although the present invention has thus been described in detail with reference to preferred examples, it will be apparent to those skilled in the art that various types of modifications are possible, based on the basic technical concepts and teachings of the present invention.

For example, the steer-by-wire steering apparatus 300 may be configured as a steering apparatus including a back-up mechanism in which steering wheel 301 and front road wheels 101 and 102 (in other words, steering device 305) are mechanically coupled to each other via a clutch or the like.

In addition, reaction force actuator 302 and steering actuator 304 are not limited to electric motors. Steering apparatus 300 may include solenoids as the actuators.

In addition, the steering operation input member is not limited to steering wheel 301. The steering apparatus may adopt, as the steering operation input member, a joystick, for example.

In addition, the intervention conditions (specifically, the first condition) indicate that yaw rate difference γd is equal to or greater than a predetermined value. MCU 401 may change this predetermined value based on the loading weight of the vehicle, the wear rate of the tires, the vehicle speed, the curvature of the curve, the driving skill proficiency of the driver, etc.

REFERENCE SYMBOL LIST

100 Vehicle
101, 102 Front road wheels (steered road wheels)
200 Steering system
300 Steering apparatus (steer-by-wire)
301 Steering wheel (steering operation input member)
303 Steering member
304 Steering actuator
305 Steering device
400 Control apparatus
401 MCU (control unit)
407 Yaw rate sensor
411 Operation angle sensor
412 Steering angle sensor

The invention claimed is:

1. A steering apparatus control apparatus mounted in a vehicle including a steering apparatus which includes a steering operation input member and a steering device including a steering actuator adding steering force to road wheels of the vehicle, and which is configured to be able to control a steering angle of the road wheels independently of an operation quantity of the steering operation input member, the steering apparatus control apparatus comprising:

a control unit that outputs a control signal to the steering actuator based on a physical quantity relating to the operation quantity of the steering operation input member, wherein the control unit is configured to:

acquire a physical quantity relating to a running state of the vehicle, calculate a target yaw rate based on the physical quantity relating to the running state of the vehicle and the operation quantity of the steering operation input member, when a braking apparatus attached to the vehicle generates braking force, compare an actual yaw rate based on the physical quantity relating to the running state of the vehicle with the target yaw rate, and output a control signal, in a direction in which a yaw rate of the vehicle is cancelled out, to the steering actuator such that the actual yaw rate approximates the target yaw rate, and when the vehicle is stopping, stop outputting the control signal, in the direction in which the yaw rate of the vehicle is cancelled out, to the steering actuator, and output a control signal for setting the steering angle of the road wheels to a steering angle matching the operation quantity of the steering operation input member to the steering actuator.

2. The steering apparatus control apparatus according to claim 1, wherein when the vehicle is stopping, the control unit reduces speed of driving of the steering actuator for setting the steering angle of the road wheels to the steering angle matching the operation quantity of the steering operation input member, compared with the speed of driving when the vehicle is running.

3. A steering apparatus control apparatus mounted in a vehicle including a steering apparatus which includes a steering operation input member and a steering device including a steering actuator adding steering force to road wheels of the vehicle, and which is configured to be able to control a steering angle of the road wheels independently of an operation quantity of the steering operation input member, the steering apparatus control apparatus comprising:

a control unit that outputs a control signal to the steering actuator based on a physical quantity relating to the operation quantity of the steering operation input member, wherein the control unit is configured to:

acquire a physical quantity relating to a running state of the vehicle, calculate a target yaw rate based on the physical quantity relating to the running state of the vehicle and the operation quantity of the steering operation input member, and when a braking apparatus attached to the vehicle generates braking force, to compare an actual yaw rate based on the physical quantity relating to the running state of the vehicle with the target yaw rate, output a control signal, in a direction in which a yaw rate of the vehicle is cancelled out, to the steering actuator such that the actual yaw rate approximates the target yaw rate, and vary driving speed for driving the steering actuator in the direction in which the yaw rate of the vehicle is cancelled out, based on deceleration of the vehicle.

4. A steering apparatus control apparatus mounted in a vehicle including a steering apparatus which includes a steering operation input member and a steering device including a steering actuator adding steering force to road wheels of the vehicle, and which is configured to be able to control a steering angle of the road wheels independently of an operation quantity of the steering operation input member, the steering apparatus control apparatus comprising:

a control unit that outputs a control signal to the steering actuator based on a physical quantity relating to the operation quantity of the steering operation input member, wherein the control unit is configured to:

acquire a physical quantity relating to a running state of the vehicle, calculate a target yaw rate based on the physical quantity relating to the running state of the vehicle and the operation quantity of the steering operation input member, when a braking apparatus attached to the vehicle generates braking force, compare an actual yaw rate based on the physical quantity relating to the running state of the vehicle with the target yaw rate, and to output a control signal, in a direction in which a yaw rate of the vehicle is cancelled out, to the steering actuator such that the actual yaw rate approximates the target yaw rate, when braking by the braking apparatus ends, stop outputting the control signal, in the direction in which the yaw rate of the vehicle is cancelled out, to the steering actuator, and output a control signal for setting the steering angle of the road wheels to a steering angle matching the operation quantity of the steering operation input member to the steering actuator, and when the vehicle is running, increase speed of driving of the steering actuator for setting the steering angle of the road wheels to the steering angle matching the operation quantity of the steering operation input member, compared with the speed of driving when the vehicle is stopping.

5. A steering apparatus control apparatus mounted in a vehicle including a steering apparatus which includes a steering operation input member and a steering device including a steering actuator adding steering force to road wheels of the vehicle, and which is configured to be able to control a steering angle of the road wheels independently of an operation quantity of the steering operation input member, the steering apparatus control apparatus comprising:

a control unit that outputs a control signal to the steering actuator based on a physical quantity relating to the operation quantity of the steering operation input member, wherein the control unit is configured to:

acquire a physical quantity relating to a running state of the vehicle, calculate a target yaw rate based on the physical quantity relating to the running state of the vehicle and the operation quantity of the steering operation input member, compare an actual yaw rate based on the physical quantity relating to the running state of the vehicle with the target yaw rate, output a control signal, in a direction in which a yaw rate of the vehicle is cancelled out, to the steering actuator such that the actual yaw rate approximates the target yaw rate, and when an abnormality occurs in the steering device, when acceleration of the vehicle is equal to or greater than a predetermined value, or when vehicle speed of the vehicle is less than a predetermined value, stop outputting the control signal for approximating the actual yaw rate to the target yaw rate to the steering actuator.

* * * * *